Patented Feb. 20, 1951

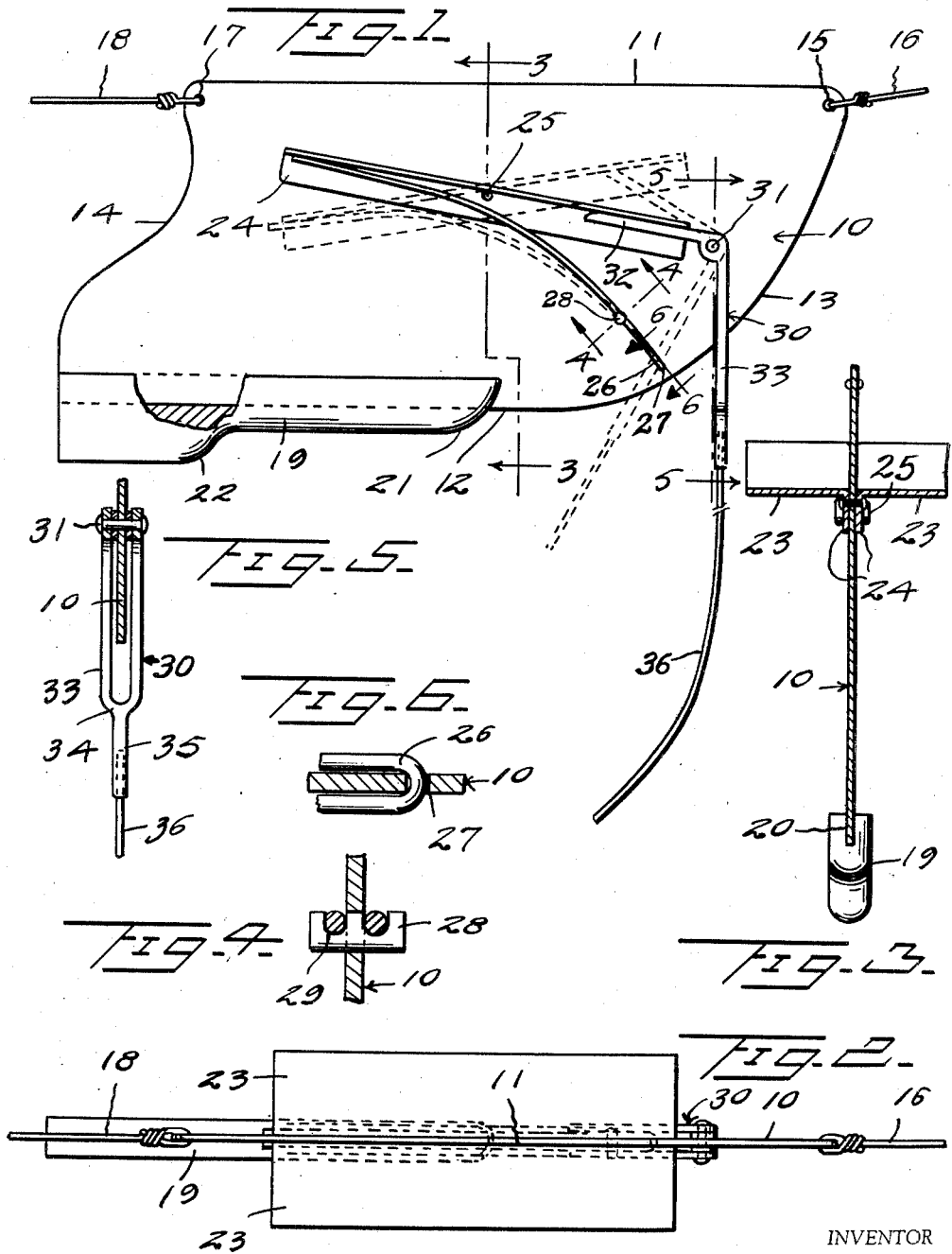

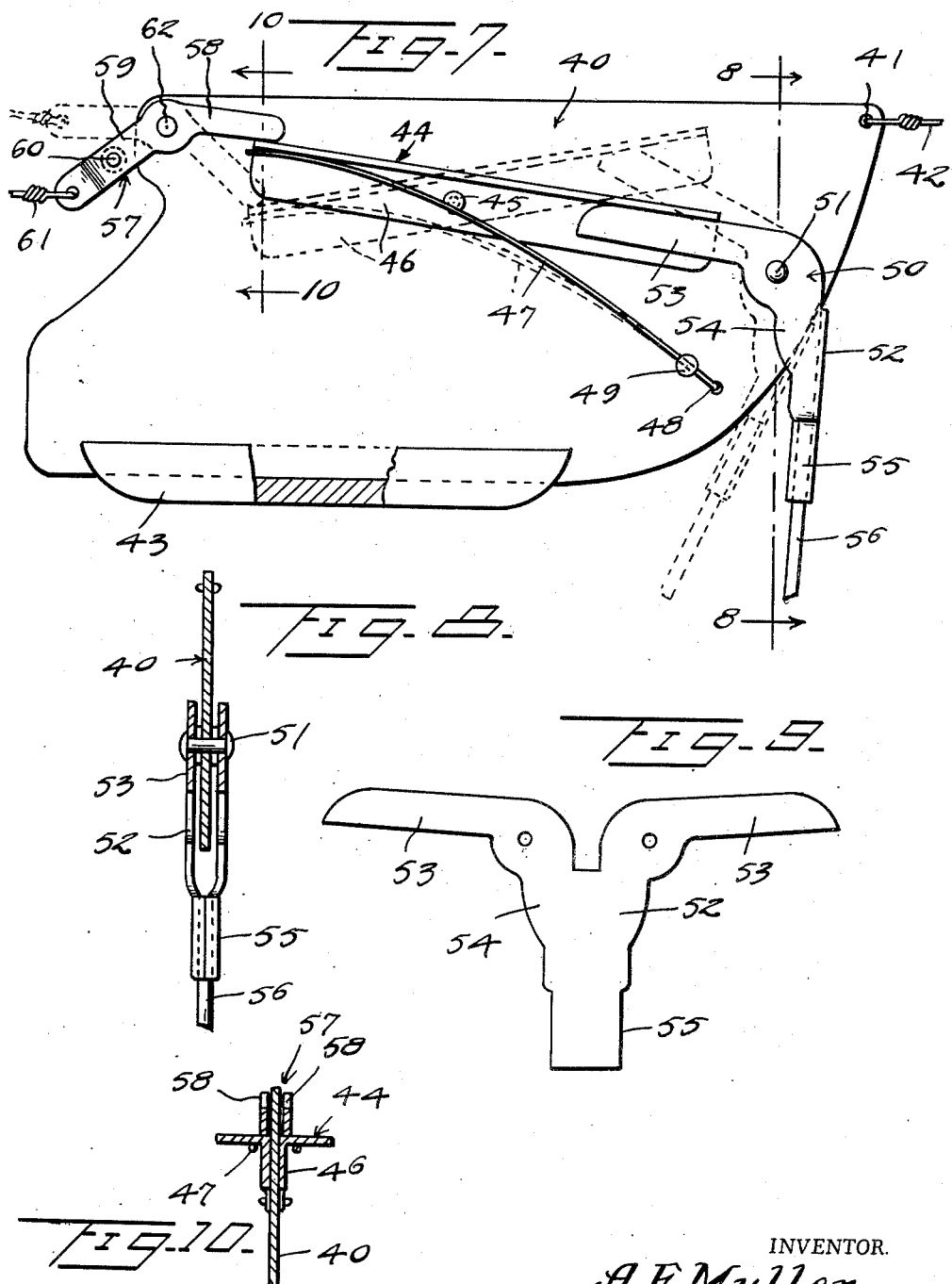

2,542,347

UNITED STATES PATENT OFFICE 2,542,347

TROLLING DEVICE

August E. Muller, New Rochelle, N. Y.

Application January 19, 1950, Serial No. 139,343

6 Claims. (Cl. 43—43.13)

This invention relates to a controlled depth trolling device.

An object of this invention is to provide line guiding device for deep trolling which is so constructed and arranged as to hold the line down close to the bottom as the line moves through the water. It is also constructed and arranged so as to hold the line at a desired trolling depth, and in the event an obstruction is encountered the device will automatically rise so as to clear the obstruction.

A further object of this invention is to have the device automatically surface after the fish is securely hooked.

A further object of this invention is to provide a device of this kind wherein the distance between the device and the bottom can be closely regulated.

A further object of this invention is to provide a device of this kind which will not readily snag onto an obstruction, and which will not place any undue strain on the fish line.

With the above and other objects in view, my invention consists in the arrangement, combination and details of construction disclosed in the drawings and specification, and then more particularly pointed out in the appended claims.

In the drawings:

Figure 1 is a detailed side elevation of a deep sea trolling device constructed according to an embodiment of this invention.

Figure 2 is a plan view of the device.

Figure 3 is a sectional view taken on the line 3—3 of Figure 1.

Figure 4 is a fragmentary sectional view taken on the line 4—4 of Figure 1.

Figure 5 is a fragmentary sectional view taken on the line 5—5 of Figure 1.

Figure 6 is a fragmentary sectional view taken on the line 6—6 of Figure 1.

Figure 7 is a detailed side elevation partly broken away and in section of a modified form of this invention.

Figure 8 is a sectional view taken on the line 8—8 of Figure 7.

Figure 9 is a plan view of the blank forming the fin operating levers.

Figure 10 is a fragmentary sectional view taken on the line 10—10 of Figure 7.

Referring to the drawings, the numeral 10 designates generally a flat plate which is formed with parallel upper and lower edges, 11 and 12, respectively, and with a convex forward edge 13. The rear edge of the plate 10 is formed on a reverse or ogee curvature 14, and plate 10 adjacent the upper edge thereof is formed with a forwardly disposed opening 15 for receiving a line 16.

The rear portion of the plate 10 is also formed with an opening 17 for receiving another portion 18 of a line or a leader which is connected to hooks or the like. The plate 10 is held in upright or vertical position by means of a weighted keel 19 which is formed with a channel 20 within which the plate 10 is firmly secured. The weight 19 is faired as indicated at 21 and 22 so as to reduce resistance when the plate 10 is pulled through the water.

In order to provide a means whereby the plate 10 will be normally drawn downwardly toward the bottom of the sea, I have provided a pair of laterally projecting fins 23 disposed one on each side of the plate 10 below the upper edge thereof, and each fin 23 is formed with a depending flange 24. A pivot member 25 is connected between the two flanges 24 and projects through the plate 10 so that the fins 23 will be rockably mounted on the plate 10.

The fins 23 are normally urged to assume a downwardly and forwardly inclined diving angle by means of a U-shaped spring 26 which is longitudinally bowed and projects through an opening 27 formed in the plate 10. The rear ends of the spring 26 engage the rear portions of the fins 23 so as to constantly urge the rear ends of the fins upwardly.

The parallel sides of the spring 26 engage over a pin 28 which projects through the plate 10 and is formed with a pair of channels 29 within which the sides of the spring 26 engage so that the spring will be held against lateral movement. The pin 28 also provides an abutment or fulcrum for the spring 26.

A pair of bell crank levers 30 are rockably mounted on a pivot 31 projecting through the plate 10, and one side 32 of each lever 30 engages beneath the forward end of a fin 23. The other side 33 of each lever 30 projects downwardly, and the two sides 33 are connected together at a point below the lower forward portion of the plate 10 as indicated at 34. A downwardly projecting shank 35 extends from the connector 34, and an elongated longitudinally bent lever operator 36 is secured at its upper end in the shank 35. The lever operator 36 may be of any desired length, and this member will determine the lowermost position of the plate 10 with respect to the bottom.

Referring now to Figures 7 to 10, inclusive, there is disclosed a modified form of this invention embodying a plate 40 having an opening 41 at its forward end with which a line 42 is adapted to be connected. The plate 41 is provided at its lower edge with a weight 43 by means of which the plate 40 is maintained in a normal upright position. A pair of fins 44 are rockably carried by the plate 40 being rockably mounted on a pivot 45 engaging through the right angular flanges 46 of the fins 44.

A pair of elongated longitudinally bowed springs 47 are connected together at their forward ends and extended through an opening 48 formed in the plate 40, and the springs 47 engage over a pin 49 extended through the plate 40 so that the rear ends of the springs 47 will be biased upwardly and will engage the rear portions of the fins 44 so as to normally rock these fins downwardly at their forward ends. A pair of bell crank levers 50 are rockably mounted on a pivot 51 extending through the plate 40, and the levers 50 are connected together by means of an integral connecting member 52. The levers 50 include an upper side 53 bearing against the under sides of the fins 44 adjacent the forward ends of the latter and also include a depending side 54.

The depending side 54 extends downwardly and projects from the forward convex edges of the plate 40, and the two sides 54 have extending from the lower ends thereof an integral sleeve 55 within which a lever operating member 56 similar to the operator 36 is adapted to be firmly secured.

In order to provide a means whereby the trolling device will automatically rise when a fish has been securely hooked, I have provided a pair of bell crank levers 57 disposed one on each side of the plate 40 and having obtusely related sides 58 and 59. The sides 58 engage over the upper sides of the fins 44, and the sides 59 project from the rear end of the plate 40 and are secured together by means of a securing member 60. A leader 61 is secured to the connected together sides 59. The two bell crank levers 57 are pivotally secured on opposite sides of the plate 40 by means of a pivot 62 which frictionally holds the levers 57 against rocking so that the fins 44 can be manually adjusted as to their angular position with respect to the length of the plate 40, and when a fish has been securely hooked, the rearward pull on the leader 61 will cause bell crank levers 57 to rock relative to the plate 40 thereby swinging the forward sides 58 downwardly, and at this time the fins 44 will be raised to the dotted line position shown in Figure 7. The trolling device will then rise to the surface of the water.

In the use and operation of this device the plate 10 is interposed in the length of a fish line, and as the line is pulled through the water plate 10 will be directed downwardly by reason of the normal diving angle of the fins 23 which is maintained by the spring 26. When the plate 10 is disposed closely adjacent the bottom with the lever operator 36 dragging along the bottom, levers 30 will be rocked slightly so that fins 23 may assume a substantially horizontally disposed position. This is the idling or leveling position of the device.

In the event operator 36 encounters an obstruction, operator 36 will be rocked upwardly and rearwardly thereby rocking levers 30 to the dotted line position shown in Figure 1. At this time fins 23 will be raised at their forward ends to a rising position so that plate 10 will be drawn upwardly until the obstruction is passed over. As soon as the obstruction is passed over springs 26 will again come into action so as to dispose the fins 23 on a downwardly and forwardly inclined diving angle.

With a device as hereinbefore described the fish line will be maintained at a point closely adjacent the sea bottom, and the hooks will be prevented from catching onto obstructions by reason of the elevating of the controlling device hereinbefore described.

What is claimed is:

1. A controlled depth trolling device comprising a flat vertically disposed blade adapted for interposing in a length of fish line, a weight fixed to the lower edge of said blade to maintain the latter in a vertical position, a pair of fins disposed one on each side of said blade, means engaging said fins between the ends thereof rockably securing said fins to said blade, a spring constantly urging said fins to be disposed on a downwardly and forwardly inclined angle whereby said blade will move downwardly as the latter moves through the water, and means depending from said blade and engaging said fins adapted upon contact thereof with an obstruction to raise the forward ends of said fins to an elevating angle whereby to move said blade upwardly and over the obstruction.

2. A controlled depth trolling device comprising a flat blade adapted for interposing in a length of fish line, means for maintaining said blade upright in the movement thereof through the water, spring-pressed fins rockably carried by said blade, for effecting normal downward movement thereof through the water, and means projecting below said blade engageable with the sea bottom or an obstruction for varying the angular position of said fins.

3. A controlled depth trolling device comprising a flat blade adapted for interposing in a length of fish line, a weight carried by the lower edge of said blade for maintaining the latter upright, a pair of laterally projecting fins rockably carried by said blade, spring-means engaging said fins for constantly urging said fins to be normally disposed on a downwardly and forwardly inclined diving angle, a pair of bell crank levers rockably carried by said plates and having one side thereof engaging beneath the forward portions of said fins, and a member fixed to the other sides of said levers and projecting below said blade, said member upon engagement with the bottom or an obstruction rocking said levers to thereby rock and forward ends of said fins upwardly.

4. A controlled depth trolling device comprising a flat blade adapted for interposing in a length of fish line, a weight fixed to and extending lengthwise of the lower edge of said blade, a pair of laterally projecting fins rockably carried by said blade, a spring engaging each blade adjacent the rear thereof normally urging said fins to be disposed on a downwardly and forwardly inclined diving angle, a pair of bell crank levers rockably carried by said blade and each having one side thereof engaging beneath the forward end of a fin, and a lever operator fixed to the other sides of said levers and depending below said blade, the lower end of said operator being bent on a rearward curvature to slidingly engage the bottom or an obstruction and thereby vary the inclination of said fins.

5. A controlled depth trolling device comprising a plate having an opening adjacent the upper edge and at the forward end thereof for attachment to a fish line, a pair of laterally projecting fins pivotally carried by said plate one on each side thereof, resilient means constantly urging said fins to rock downwardly at their forward ends, a pair of bell crank levers rockably carried by said plate and having one side thereof disposed beneath the forward ends of said fins, the other sides of said levers projecting downwardly and connected together, a lever operator secured to said other sides of said levers and projecting downwardly and rearwardly, a pair of depth regulating levers disposed one on each side of said plate and each formed of obtusely related sides with one side thereof engaging over the upper side of a fin at the rear of the latter and with the other sides thereof projecting from the rear of said plate, said regulating levers adapted for connection to a leader, and frictional pivot means rockably securing said regulating levers to said plate whereby said regulating levers may be manually adjusted to hold said fins at a predetermined angle, until a predetermined pull is exerted on the leader whereby said levers will rock said fins upwardly at their forward ends to a rising position.

6. A trolling device comprising a plate, a pair of laterally projecting fins pivotally carried by and projecting from opposite sides of said plate, springs constantly urging said fins to rock downwardly at their forward ends, means pivotally carried by said plate engaging beneath the forward ends of said fins and projecting below said plate for rocking said fins upwardly when an obstruction is encountered which is disposed below said plate, and friction means engaging the rear ends of said fins whereby the latter may be manually adjusted to dispose said fins on a predetermined diving angle.

AUGUST E. MULLER.

REFERENCES CITED

The following references are of record in the file of this patent:

UNITED STATES PATENTS

| Number | Name | Date |
|---|---|---|
| 1,320,804 | Squarebriggs | Nov. 4, 1919 |
| 2,219,886 | Biomme | Oct. 29, 1940 |
| 2,300,178 | Ross | Oct. 27, 1942 |

FOREIGN PATENTS

| Number | Country | Date |
|---|---|---|
| 290,840 | Italy | Nov. 30, 1931 |